United States Patent Office 2,709,971
Patented June 7, 1955

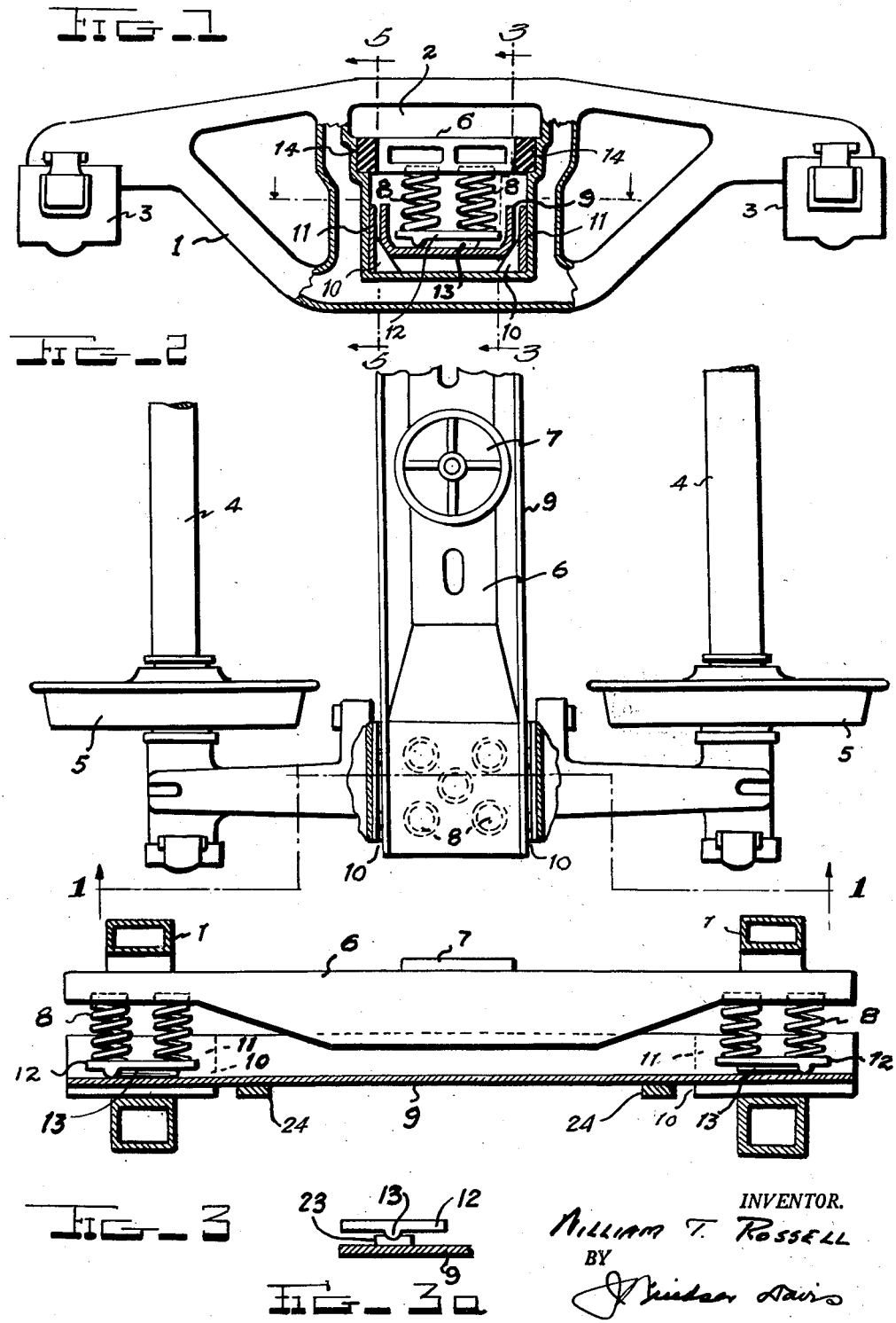

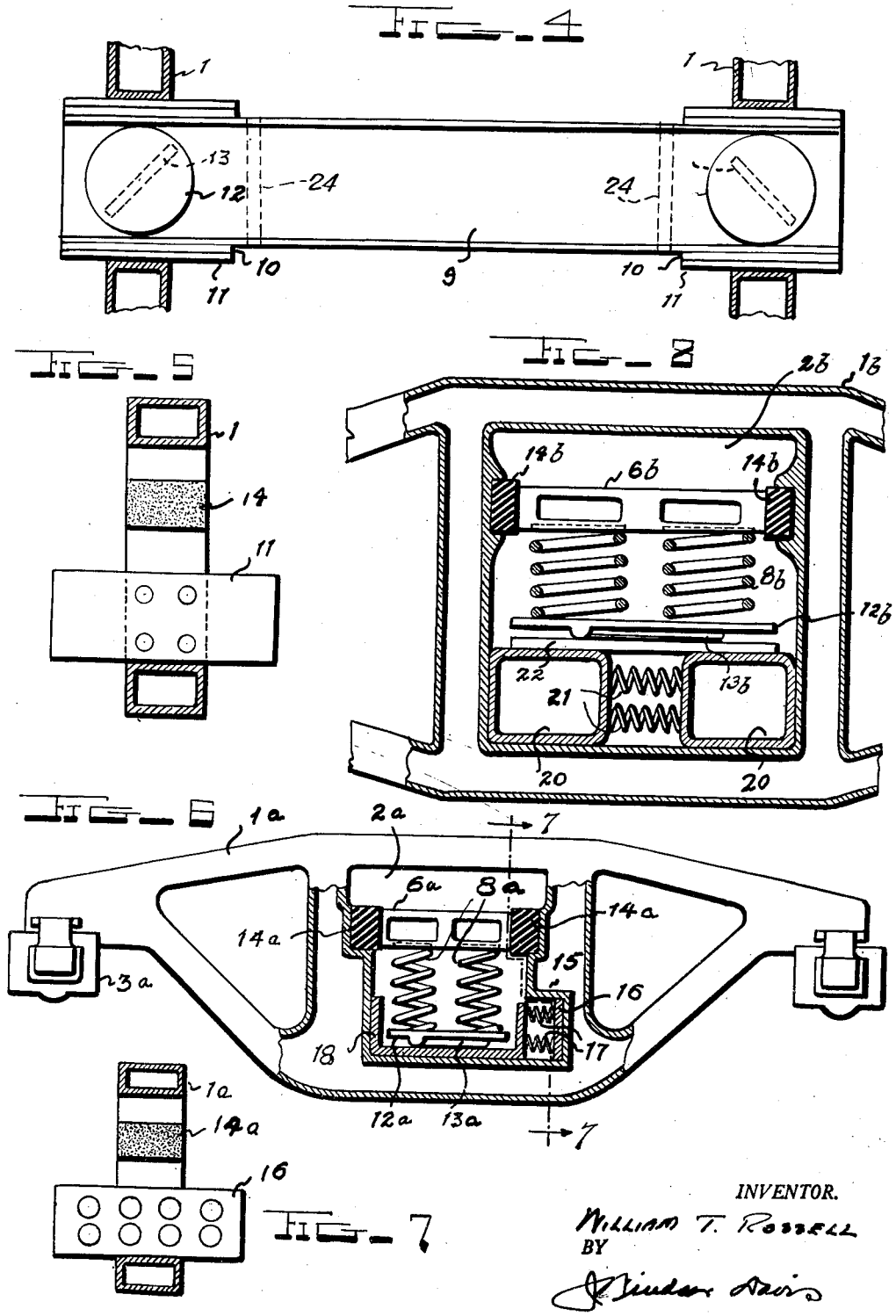

2,709,971

RAIL TRUCK SQUARING MEANS

William T. Rossell, New York, N. Y., assignor to Transit Research Corporation, New York, N. Y., a corporation of New York Application October 23, 1950, Serial No. 191,674

5 Claims. (Cl. 105—197)

This invention relates to rail trucks of the type composed essentially of two main side frames and a bolster assembly, the side frames not being connected by integral cross members, as are widely used for freight cars, and has for its object to provide means for improving the riding quality thereof.

In such trucks, journal boxes which house journal bearings, are rigidly secured to the side frames. The journal bearings are relied upon to maintain the axles normal to the side frames and hence parallel with each other. The bolster assembly is usually composed of coil springs resting upon an opening in each side frame and a bolster supported by the coil springs which supports the car body and which is limited in its movements laterally and longitudinally of the side frames by the sidewalls of the openings in which the bolster supporting springs reside. There are numerous variations of this design, but the basic features are the same.

The main disadvantage of that design is that it is so hard riding that much freight is damaged in ordinary transit. This characteristic has two basic causes, the first of which is the failure of the journal bearings to maintain the axles normal to the side frames thus permitting the truck to form a parallelogram instead of a rectangular form. This permits the truck to hunt, i. e. it permits an axle (or both axles) to assume a position at an angle with the track rails whereupon the wheel flanges contact the rails and change the direction of the wheels angularly toward the opposite rail. This hunting motion becomes very violent and is caused by loss of rectangularity. By the very nature of the problem any attempt to use the bolster to maintain the rectangularity must result in loss of the function of the bolster.

It is therefore an object of this invention to provide means for relieving the journal bearings of the entire function of trying to maintain rectangularity, this means being cheap to construct and easy to install on existing trucks, which will be additive to the effort of the journal bearings in this respect, rather than in replacement thereof and which will leave the bolster free to perform its swinging functions.

The second cause of hard riding in trucks of this design is in the failure to provide proper snubbing for the swing motions of the bolster. Bolster springs in freight trucks are necessarily very stiff. Since hunting in such trucks is always expected the bolsters are severely limited in their possible swing motions, and this is ordinarily accomplished by simple stops or abutments against which the bolster produces severe impacts. Snubbing means capable of softening this impact must be so strong that almost all bolster motion is lost and, at best, has proven uncertain because its effect is seriously affected by failure of the truck to maintain rectangularity. In other words snubbing means between the frame and the bolster automatically becomes affected by out-of-normal position of the bolster with respect to the side frames.

Another prime object of this invention is, therefore, to provide means for maintaining rectangularity of the truck, as above mentioned, thereby relieving the bolster of the violent shocks ordinarily encountered, and to provide motion damping means which will permit essentially free motion of the bolster at or near its center position but which will gradually build up snubbing resistance to swinging motions in proportion to the amplitude of the motions.

While rectangularity of the truck is essential to the prevention of hunting motion it must be recognized that a truck frame constructed to resist all forces tending to throw it out of rectangular shape would be exceedingly heavy and unduly costly. Another object of this invention, therefore, is to provide means for maintaining the rectangularity during all ordinary running over good tracks but with means inherent in the design to permit a break away thereof followed by immediate and automatic return to rectangularity in response to the imposition and passing of any force beyond an amount predetermined to be capable of causing binding, breakage or other damage to the frame, axles or other truck parts.

Various other objects and advantages will become hereinafter more fully apparent as reference is had to the accompanying drawings in which my invention is illustrated, by way of example, and in which Figure 1 is a side elevation of a freight truck, without wheels, showing my invention applied thereto, the intermediate portion being shown in section taken along the line 1—1 of Figure 2, Figure 2 is a top elevation of half the truck of Figure 1 partially in section at one side of the bolster, Figure 3 is a transverse vertical section taken along the line 3—3 of Figure 1, Figure 3a is an enlarged detail view of a spring seat assembly, Figure 4 is a horizontal section transversely of the truck, taken along the line 4—4 of Figure 1 with the bolster springs removed, Figure 5 is a detail section taken along the line 5—5 of Figure 1, Figure 6 is a view similar to Figure 1 showing a modification of the invention, Figure 7 is a detail section taken along the line 7—7 of Figure 6, and Figure 8 is a view similar to Figures 1 and 6 showing a further modification.

More particularly 1 indicates a main side frame of which there are two, substantially identical. Frames of this general type may be built up but are generally cast of hollow construction with a central bolster opening 2 therethrough. At the ends thereof, either cast therewith or fixedly secured thereto are journal boxes 3 which house journal bearings (not shown) which engage the axles 4. Wheels 5 are rigidly secured on the axles for rotation therewith.

A bolster 6 has a center bearing 7 which receives the king pin (not shown) of a body. The ends of the bolster extend into the frame openings 2 where they are supported by the bolster springs 8.

The truck as thus far described is of conventional type. It is characterized by these two features: the two side frames 1 are not connected by integral cross members and hence are independent; and the side frames rely upon the engagement of the journal bearings with the axles for alignment of the side frames. I am aware that some trucks in wide usage provide wedge or guide means of various kinds to cause the bolster to aid in the alignment but such constructions are imperfect in operation, they rob the bolster of a part of its normal swinging function and, in fact, they merely add weight to applicant's contention that the journal bearings alone are incapable of maintaining proper alignment of the side frames.

In order properly to align the side frames I interpose stiff member 9 which extends from one side frame to the other and which extends beneath the springs 8. As shown in Figure 1 this member 9 is of channel form with inclined sides to seat upon wedge shaped members 10. The members 10, in turn, seat on the bottom of the openings 2. Since the members 10 are, preferably, longer than the thickness of the frames 1 I provide backing plates 11 between the sidewalls of the openings 2 and the wedges 10, as best shown in Figures 4 and 5. And since the members 10 and 11 are fixedly secured to the side frames 1 they may be considered an integral part thereof. If desired, safety stops 24 may be welded to the bottom of the member 9 for contact with the members 10 to prevent undue relative lateral movements of the members 9 and 10.

Assume, for the moment, that the springs 8 rest directly upon the stiff member 9. The action would then be as follows: any tendency to misalignment of the side frames 1 would be resisted by the member 9 which is pressed against the fixed members 10 and 11 by the weight of the bolster acting through the springs 8. If the forces tending to cause misalignment of the frames 1 become excessive the stiff member 9, which is called a "rectaligner," can and will break away from its seat and, as soon as the excessive forces have sufficiently diminished, will return to its seat. The action is similar to a toggle action in that there will be no movement of the member 9 until the breakaway point is reached.

This action frees the bolster entirely for its proper functions which are to swing laterally of the frames 1 and to cooperate with some means concerned only with a proper control of those swinging motions.

Toward this end I then provide a spring receptacle 12 for the springs 8, the receptacle having a rocker 13 outwardly thereon for rocking engagement with the member 9. The rockers 13 are positioned at an angle with respect to the longitudinal center line of the bolster, as best shown in Figure 4. Due to the small scale of the drawings the rocker seats are not shown in Figures 1 and 3, however, Figure 3a shows a view of a rocker seat 12 taken normal to the axis of the rocker 13 with the rocker having a seat 23. All rockers 13 are to be similarly equipped. Thus, as the bolster swings, the receptacles 12, will tilt on their rockers 13 thus causing the bolster to change its path of swinging movement as described in my copending application Serial No. 148,795, filed March 10, 1950. As described in that application, one component of the swinging force will cause the bolster ends to move against the friction pads 14 positioned in the walls of the openings 2. The snubbing action which results will effectively control the swinging movements of the bolster by offering a resistance in proportion to the swinging motion.

With respect to the pads 14, they may be made of hard rubber, of brake block material or of any other material which offers a high degree of friction in response to rubbing motions of the bolster thereagainst.

In Figure 6, the side frames 1a, the bolster openings 2a, the journal boxes 3a, the bolster 6a and the spring 8a correspond exactly to the parts 1, 2, 3, 6 and 8 respectively of Figures 1 to 5 inclusive, with the exception that the right sidewall of the opening 2a has been inset at 15 to receive a plate 16, corresponding to the plate 10 of Figure 1, and a set of small springs 17 which have heavy pressure contact with a stiff member 18 which corresponds to the member 9 of Figure 1.

The stiff member or rectaligner 18 extends across the truck from one frame member 1a to the other with its ends seated in the openings 2a. It is of channel form with its base resting directly on the bottom of the openings 2a and with its left wall (as viewed in Figure 6) having surface engagement with the left wall of the opening 2a. Its right wall is contacted by the springs 17. A spring receptacle 12a receives the springs 8a which support the bolster 6a, this receptacle being equipped with a rocker 13a identical with the receptacle 12 and the rocker 13, previously described.

In operation, the stiff member 18 will maintain the side frames 1a, with their axles, in proper rectangular alignment. When an excessive force is encountered which would be likely to break or bend the truck parts, the stiff member 18 and the springs 17 will resist this force until it becomes excessive whereupon the left surface of the member 18, as viewed in Figure 6, in contact with the walls of the opening 2a will break that surface contact and compress some or all of the springs 17. The action will be a break-away action similar to that of a toggle, and as soon as the excessive force has passed the springs 17 will restore the surface contact of the member 18 with the opening 2.

It should be noted in this connection that, with the design shown, if springs 17 made of coils, rubber or other resilient material are placed on both sides of the member 18 that there will be no break-away, toggle type action but rather a progressive yielding of the springs which is not the action which applicant desires. Applicant insists that hunting is caused by axles and wheels being able to assume an angle with respect to the rails and that absolute rectangularity of the truck must be maintained if hunting is to be overcome. An out-of-parallel movement of the axles of such small dimensions as $\frac{1}{16}$ of an inch is sufficient to cause hunting. The stiff member 18 will accomplish this so long as it remains in place, the break-away feature being merely a safety device and a means of restoring the member 18 to its proper position, promptly and automatically. By thus eliminating hunting motions and by thus relieving the bolster of all functions except those properly assignable thereto, the bolster 6a is then subject to free suspension on the springs 8a. As the bolster swings, the rockers 13a cause the springs to tilt angularly toward the walls of the opening 2 thus forcing the bolster 6a against the friction pads 14a as previously described. That portion or component of the swinging force which causes the bolster to move against the friction pads may be altered by altering the angularity of the rockers 13a with respect to the path of swinging movement of the bolster.

Figure 8 illustrates a second modification in which the parts bearing a numeral followed by the reference character be correspond to the parts bearing the same numeral in Figures 1 to 5. The stiff member 9 and the wedges 10 have been replaced by a pair of stiff members 20 urged apart by springs 21 and surmounted by a free spanning plate 22 which serves as a support for the rocker 13b. The members 20 extend from one side frame 1b to the other and have substantial surface contact with the sidewalls of the opening 2b. The springs 21 are capable of exerting heavy pressure so that the surface contacts will remain established until an excessive force is encountered, sufficient to cause a temporary break-away of that surface contact, as previously described.

The action of the device as shown in Figure 8 is exactly the same as previously described. An advantage of this particular modification is that it may be applied to existing trucks. A manufacturer can therefore supply a "package" to the railroad companies for the conversion of present trucks to improve operation, the package of parts being readily installed in the railroads' own shops.

The invention as herein revealed is capable of numerous mechanical changes. Thus, the stiff members or rectaligners do not have to reside in the bolster openings but may be mounted otherwise and numerous ways of arranging the springs and shape of rectaligners will suggest themselves to those skilled in the art so that I desire to be extended protection as defined by the scope of the appended claims.

1. In a rail truck, two independent side frames each connected to the ends of two axles, each of said frames having bolster openings therethrough, a bolster, springs in said openings supporting the ends of said bolster, a stiff member extending between said frames and seated at its ends in said openings beneath said springs, said stiff member having direct surface contact with said openings on at least one vertical side thereof, and spring means active against another side of said stiff member maintaining said surface contact thereby maintaining the rectangular form of the truck, said stiff member overcoming said pressure means in response to excess forces misaligning said frames, thereby causing a break-away of said surface contact, said means automatically restoring said contact upon cessation of the excess of said forces.

2. In a rail truck, two independent side frames each connected to the ends of two axles, each of said frames having bolster openings therethrough, a bolster, springs in said openings supporting the ends of said bolster, two stiff members extending between said frames with their ends residing in said frame openings beneath said springs, said members having a substantial area of contact with the base and with the vertical sides of said openings and spring means between said two stiff members urging said stiff members into heavy surface contact with said side frames.

3. In a rail truck two independent side frames each connected to the ends of two axles, each of said frames having bolster windows each comprising a base and vertical columns, a bolster, springs in said openings supporting the ends of said bolster, a stiff member having its ends inserted between said bolster springs and the base of each of said windows, said stiff member having a substantial area of contact both with said bases and with at least one vertical column of each of said windows, and spring means imposing a heavy continuous pressure between said stiff member and said columns, said frames when misaligned in response to excess vertical forces causing a breakaway of the surface contact of said stiff member with said bases against the pressure of said bolster springs, said frames when misaligned in response to excess horizontal forces causing a break-away of the surface contact of said stiff member with said columns against the pressure of said spring means, said bolster springs and said springs respectively restoring the surface contact of said stiff member with the base and columns of said windows upon cessation of said excess forces.

4. In a rail truck wherein two independent side frames each having a bolster opening window therethrough are connected to the ends of two axles and in which the bolster windows are composed of two vertical columns, a base and a top closure member, the combination of a stiff member extending from one of said windows to the other and having substantial surface contact therewith vertically and horizontally, spring means maintaining heavy pressure on said stiff member both in a vertical direction against the base of said window and horizontally against one inside wall of at least one column of each of said windows, said stiff member being capable of breaking its surface contact with respect to said columns and said bases in response to excess forces misaligning said frames either in a vertical or horizontal direction, said spring means automatically re-establishing surface contacts of said stiff member both vertically and horizontally upon cessation of said excess forces.

5. In a rail truck werein two independent side frames each having a bolster opening window therethrough are connected to the ends of two axles and in which the bolster windows are composed of two vertical columns, a base and a top closure member, the combination of a stiff member extending from one of said windows to the other and having substantial surface contact therewith vertically and horizontally, bolster springs maintaining heavy pressure surface contact between the ends of said stiff member and the bases of said windows, and spring means maintaining heavy pressure surface contact between the vertical side walls of said stiff member and one inside wall of at least one column of each of said windows, said side frames when misaligned vertically or horizontally under excess forces causing a breakaway of the surface contact of said stiff member with the bases of said windows or with the inside walls of said columns, as the case may be, said bolster springs and said spring means respectively and automatically causing a re-establishment of said surface contacts upon cessation of said excess forces.

References Cited in the file of this patent

UNITED STATES PATENTS

| | | |
|---|---|---|
| 869,652 | Pulliam | Oct. 29, 1907 |
| 993,578 | Covert | May 30, 1911 |
| 1,656,166 | Bush | Jan. 17, 1928 |
| 2,321,845 | Nystrom et al. | June 15, 1943 |